United States Patent Office 3,484,197
Patented Dec. 16, 1969

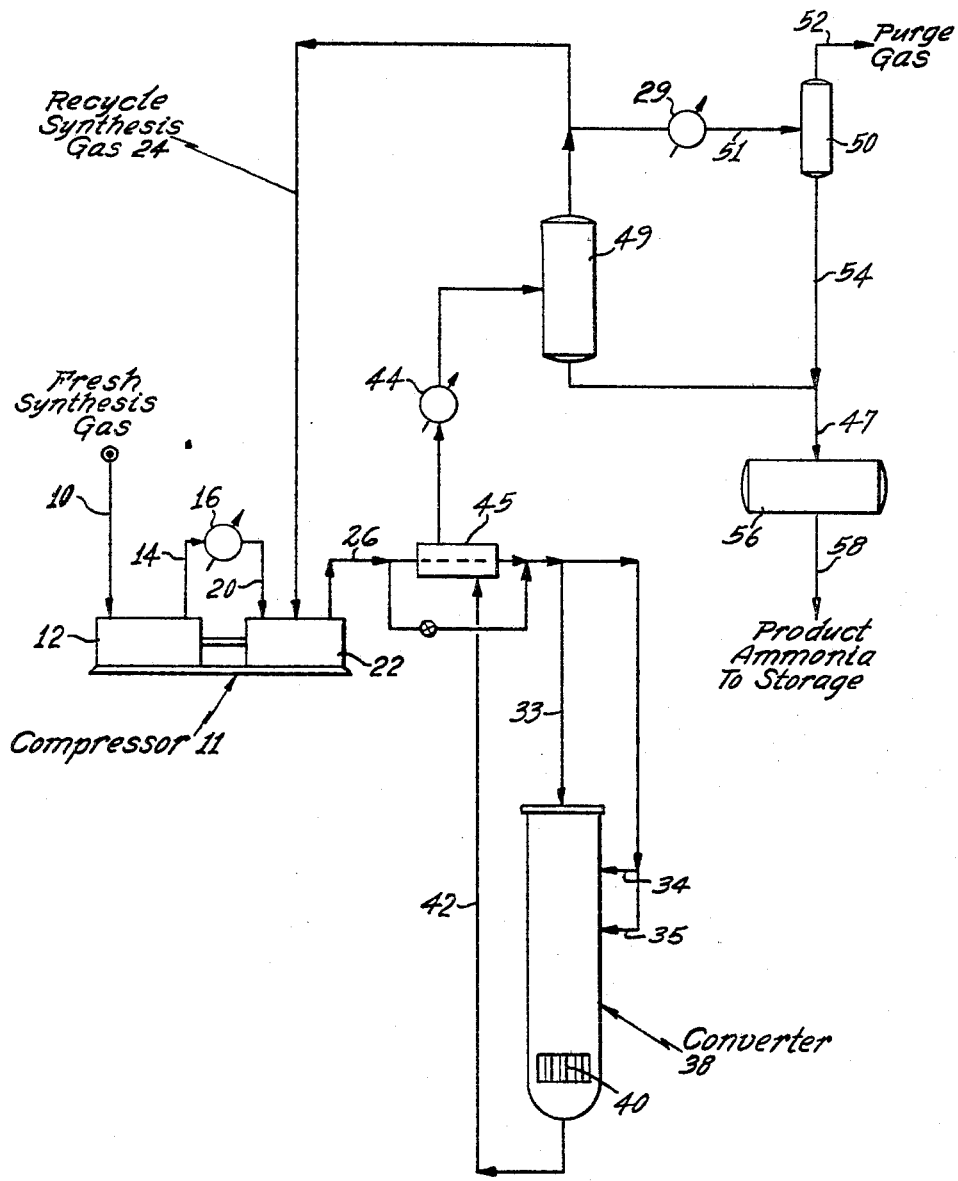

3,484,197
PROCESS FOR CARRYING OUT CYCLIC SYNTHESIS REACTIONS AT ELEVATED PRESSURES
James Ambrose Finneran, Garden City, and Hayes Claude Mayo, Huntington, N.Y., assignors to Pullman Incorporated, Chicago, Ill., a corporation of Delaware
Continuation-in-part of application Ser. No. 505,653, Oct. 29, 1965. This application Sept. 18, 1967, Ser. No. 668,608
The portion of the term of the patent subsequent to Oct. 31, 1984, has been disclaimed
Int. Cl. C01c *1/04*
U.S. Cl. 23—199                                 5 Claims

ABSTRACT OF THE DISCLOSURE

The present invention embraces an improved cyclic synthesis process and more particularly an improved method of compressing recycled reactants in a cyclic synthesis process. The term "cyclic synthesis process" denotes a process wherein gaseous reactants at elevated pressures are passed to a reaction zone wherein a part but not all of the reactants react to form the desired product. The synthesis of ammonia from its elements and the synthesis of methanol from carbon monoxide and hydrogen are exemplary of this type of synthesis, in which unreacted reactants must be recycled, repressurized, and reintroduced into the reaction zone to preclude their being lost to the system. The present invention permits the use of a single compressor to both pressurize the fresh reactants stream and to repressurize the recycle stream; certain aspects of the invention concerning precluding the solids-forming reaction between ammonia and carbon dioxide are useful in the cyclic synthesis of ammonia.

The present application is a continuation-in-part of our prior and copending application Ser. No. 505,653, filed Oct. 29, 1965, now U.S. Patent 3,350,170.

The present invention relates to an improved process for carrying out cyclic synthesis reactions at elevated pressures, and, more particularly, to improvements in the method of compressing fresh and recycle synthesis gases in such process. The method of the invention is generally applicable to any cyclic synthesis process, i.e., a process in which a synthesis gas containing reactants is passed at an elevated pressure into a reaction zone wherein suitable conditions of temperature, pressure, reactant concentrations, etc. are maintained to cause the reactants to react and form the desired product. A catalyst may be utilized in the reaction zone to increase the rate of reaction. Since, as is well known from basic principles of chemical reaction equilibrium, the desired reaction will not go to completion within the reaction zone and the reaction zone effluent consequently contains a considerable amount of unreacted reactants. In order to have an economical process these unreacted reactants obviously must be recycled to the reaction zone. This is accomplished by repressurizing the unreacted reactants to overcome the pressure drop sustained in passing through the reaction zone, combining this recycle synthesis gas with pressurized fresh synthesis gas, and passing the combined fresh and recycle synthesis gas to the reaction zone. Typical examples of commercial cyclic synthesis processes are the synthesis of ammonia from its elements and the synthesis of methanol from carbon monoxide and hydrogen.

Prior art methods for carrying out cyclic synthesis reactions have required the use of a second so-called "booster" compressor to repressurize the reaction zone effluent in order to overcome the pressure drop sustained by the gaseous mixture in passing through the reaction zone. The pressure drop through the reaction zone is usually appreciable, since most processes require passing the reactant material through one or more beds of catalyst. Thus, it is necessary to repressurize the reaction zone effluent prior to admixture with the pressurized fresh synthesis gas.

The method of the present invention permits the use of a single compressor to perform both fresh and recycle synthesis gas compression and thus eliminate entirely the need for a second, booster compressor. Those conversant with the art will recognize the magnitude of the savings thus effected, especially in modern large capacity plants, since the booster compressor is an item of considerable expense.

Prior art methods for carrying out cyclic synthesis reactions may be conveniently illustrated by reference to the most commercially significant cyclic synthesis process, the synthesis of ammonia from nitrogen and hydrogen. The shortcomings of the prior ammonia synthesis art relative to the need for a second compressor are generally applicable to all cyclic synthesis processes; in addition certain shortcomings of the prior art relative to formation of solids by chemical reaction when fresh and recycle synthesis gases are admixed are pertinent only to the ammonia synthesis art, as will be clearly indicated herein. Thus, prior art cyclic synthesis methods may be conveniently illustrated by reference to ammonia synthesis.

The prior art method for the synthesis of ammonia from synthesis gas containing nitrogen and hydrogen involves compressing fresh synthesis gas from the relatively low pressure at which it is generated (atmospheric pressure up to a few hundred p.s.i.g.) to the relatively high pressure at which it is contacted over the synthesis catalyst (ranging from a minimum of about 1500 p.s.i. up to a maximum of about 20,000 p.s.i., depending upon the particular synthesis process used). The compressed fresh synthesis gas is combined with compressed recycle synthesis gas and may be chilled to condense and allow separation of some of the ammonia product in the combined gases. The remaining chilled gas is then preheated to reaction temperature (500 to 1000° F.) and contacted over one or more beds of catalyst to obtain partial conversion of the nitrogen and hydrogen to ammonia. The resulting gas containing ammonia is cooled by heat exchange with the feed gas to preheat the latter and may be further chilled to condense and allow separation of some of the product ammonia. In any case, all or a major portion of the product gas containing some ammonia is compressed in a booster compressor before being recycled to join the fresh synthesis gas. Booster compression is used to overcome the pressure drop in the conversion system or so-called "synthesis loop," i.e., the converter and associated equipment, which normally amounts to between about 100 and about 500 p.s.i. A minor portion of the recycle synthesis gas is normally purged from the loop to prevent the build-up of various gases therein which are inert in the reaction, for example methane, argon and helium. The necessity of a booster compressor to repressurize the recycle synthesis gas is common to all prior art cyclic synthesis processes as repressurizing is required in order to overcome the pressure drop sustained in the conversion zone apparatus and associated equipment.

The fresh synthesis gas normally contains small amounts of carbon dioxide, usually about 1–10 p.p.m. Since carbon dioxide is known to react under certain conditions with ammonia to form solid ammonium carbamate and, if water is also present, solid ammonium carbonate and/or solid bicarbonate, and since any solids formed would tend to accumulate in the equipment, care must be taken to employ conditions at which the aforesaid reaction products cannot form or to accommodate them if formed in a way which will not force interruption of operations. In the case of the prior art method described above, solids can only be formed upon combining the compressed fresh synthesis gas containing the carbon dioxide with the compressed recycle synthesis gas containing ammonia. Since the combined gases, after chilling, are introduced into a liquid separator, any solids formed are withdrawn therefrom along with the liquid product ammonia and operating difficulties are minimized. The solids formation problem is peculiar to ammonia synthesis and does not afflict the prior art in general.

Many synthetic ammonia plants currently being designed, constructed and brought into operation are of large design capacity, for example, nominal capacities of 600 to 1,000 tons of ammonia per day, and more. The trend to ever larger capacity plants exists likewise in other cyclic synthesis processes, notably methanol synthesis. The relatively large volume of synthesis gas required to be compressed in such plants justifies the use of centrifugal compressors for raising synthesis gas pressure up to as high as about 5000 p.s.i.g., depending upon plant capacity and economic criteria. Such pressures are achieved in a centrifugal machine by means of a plurality of impellers or wheels on the shaft of the machine. Unfortunately, however, the volume contraction which occurs in the course of the passage of the gas through the machine is such that the last wheel or wheels may not be fully loaded, thus creating a difficult design problem and possible inefficiency and instability.

One object of the present invention is to provide an improved cyclic synthesis process.

Another object of the invention is to provide an improved cyclic synthesis process for the synthesis of ammonia.

Still another object of the invention is to reduce investment and operating costs of plants for carrying out cyclic synthesis processes in general.

Still another object of the invention is to improve the efficiency of compressing both fresh and recycle synthesis gas in cyclic synthesis processes in general and in ammonia cyclic synthesis processes in particular.

A further object of the invention is to provide an improved synthetic ammonia process utilizing but a single compressor which avoids the formation of solid products of the reaction of ammonia with carbon dioxide within the single compressor.

Various other objects and advantages of the invention will be apparent to those skilled in the art from the following detailed discussion and description, taken with the accompanying drawing which illustrates a preferred embodiment of the invention as employed in the synthesis of ammonia.

Achievement of the foregoing objects in accordance with the invention is attained, for example, in ammonia synthesis, by a combination of steps comprising contacting synthesis gas containing nitrogen and hydrogen in the presence of a catalyst in a conversion zone to produce ammonia by reaction of a part of the synthesis gas, separating ammonia product from the effluent of the conversion zone, admixing the remaining effluent (which constitutes the recycle synthesis gas) with fresh synthesis gas compressed to an intermediate pressure, compressing the resulting admixed gases, and introducing the entire stream of compressed admixed gases into the conversion zone. Thus, recycle synthesis gas is admixed with partially compressed fresh synthesis gas and the admixed gases are compressed together, thereby allowing elimination of the booster compressor heretofore used for the recycle synthesis gas. It will be appreciated that elimination of the booster compressor is reflected in a large saving in the initial installed cost of the plant. In the case of ammonia synthesis the conditions at which fresh and recycle ammonia synthesis gases are admixed are selected to preclude the formation of solid products of the reactions of carbon dioxide and ammonia. The combination of process steps described is of course applicable to any cyclic synthesis process.

In the case of plants which utilize centrifugal compressors for compression of synthesis gas, the object of improving the efficiency of compressing admixed recycle and fresh synthesis gas in a common compressor is achieved by introducing the recycle synthesis gas into the compressor (in which the fresh synthesis gas is being compressed) at a sidestream inlet immediately upstream from the last wheel or wheels of the plurality of wheels mounted on the shaft of the machine. The volume of gas thus added to the last wheel or wheels compensates for contraction of the volume of fresh gas as it passes through the machine and thus prevents under loading of the last wheel or wheels which could cause machine instability and inefficiency.

The method of the invention is applicable independently of the source of synthesis gas and the process by which the synthesis gas is prepared. The invention is equally applicable to utilization of synthesis gas prepared from any of the many known feedstocks by any of the processes associated therewith. Some examples of commonly used feedstocks to obtain hydrogen for ammonia or methanol synthesis are natural gas, light distillate, naphtha and refinery gases; some associated processes are steam reforming, partial oxidation and low temperature purification. The source of the synthesis gas will determine the nature and extent of treatment of the gas which is required before the gas is charged to the process of the invention as fresh synthesis gas.

Fresh ammonia synthesis gas, consisting esentially of hydrogen and nitrogen in a mol ratio of about 3:1, is purified before being charged to the ammonia synthesis process by removal or reduction to tolerable levels of contaminants such as oil vapors, unsaturated hydrocarbons, sulfur compounds, water and carbon oxides which can poison catalysts or solidify and foul equipment.

In addition to these equipment fouling and catalyst poisoning contaminants, ammonia synthesis gas may also contain gases such as methane, helium and argon, which while they do not poison the synthesis catalyst or foul equipment, must be prevented from accumulating in the synthesis circuit to such an extent that their presence appreciably reduces the partial pressure of the reactant gases, i.e., hydrogen and nitrogen, and thereby decreases the rate of reaction. Accumulation of these gases (e.g., methane, helium and argon) which are inert to the ammonia synthesis synthesis reaction is prevented by purging the synthesis system in proportion to the rate of introduction of these inert gases via the fresh synthesis gas. Purging is not normally required if the total inerts concentration in the fresh synthesis gas is about 0.1 percent or less, since this low quantity of inerts will normally leave the system dissolved in the product.

The concentration of inert, non-catalyst poisoning gases such as methane, helium and argon in the fresh synthesis gas usually ranges from about zero to about 2.0 percent, in the case of synthesis gases which have been through a cryogenic processing step, for example, a low temperature process to separate hydrogen from high-boiling point impurities such as methane, and about 0.4 to about 2.0 percent for synthesis gases which have not been so treated. Carbon oxides (which are catalyst poisons) are reduced to as low a concentration in the fresh synthesis gas as is economically possible, before the fresh synthesis gas is provided to the ammonia synthesis system. Carbon oxides are thus usually present in the purified fresh synthesis gas to the extent of about 5 p.p.m. to about 10 p.p.m. although the concentration of carbon oxides may, in some cases, be as low as 1 p.p.m. Thus, purified synthesis gas, usually containing up to about 2.0 percent of inerts and about 5 p.p.m. to about 10 p.p.m. of carbon oxides, is generally provided to the ammonia synthesis system at a pressure of about 100 p.s.i.g. to about 750 p.s.i.g.

Reference is now made to the accompanying drawing for a detailed description and example of a preferred embodiment of the invention as applied to ammonia synthesis. Fresh synthesis gas containing nitrogen and hydrogen is introduced via line 10 into the first stage 12 of centrifugal compressor 11 and compressed to a first stage pressure of about 850 to about 950 p.s.i.g. First stage 12 contains 9 wheels. The compressed gas is passed via line 14 through cooling zone 16 where it is reduced in temperature.

Cooled fresh synthesis gas at the first stage pressure and a temperature of about 40° F. to about 50° F. is withdrawn from cooling zone 16 and passed via line 20 to the second stage 22 of centrifugal compressor 11. The second stage 22 also contains 9 wheels. Recycle synthesis gas, obtained as hereinafter described, containing product ammonia, unreacted nitrogen and hydrogen and small amounts of inert gases, is introduced via line 24 into a sidestream inlet of second stage 22 and admixed with the fresh synthesis gas from the wheel next preceding the sidestream inlet at an intermediate pressure of about 1200 to about 3000 p.s.i.g. The fresh synthesis gas emerging from the wheel next preceding the sidestream inlet is at a temperature of about 225° F. to about 325° F. The recycle synthesis gas is at a temperature of about 85° F. to about 185° F. The resultant admixed gases are at a temperature of about 100° F. to about 180° F. as they enter the final wheel or wheels of second stage 22. The admixed fresh and recycle synthesis gases are compressed in the final wheel or wheels of second stage 22 to a final pressure of about 1400 to about 3200 p.s.i.g. and a final temperature of about 100° F. to about 225° F. The admixed compressed gaseous stream is withdrawn via line 26.

The recycle synthesis gas introduced to second stage 22 via line 24 has undergone a pressure drop of about 150 to about 250 p.s.i. in its passage through converter 38 and associated equipment, and is consequently at a pressure of about 1200 to about 3000 p.s.i.g., as stated above. The point of sidestream entry into second stage 22 is selected so that the recycle gas is introduced at a location where the pressure within the second stage is the same or only slightly less than the pressure at which the recycle synthesis gas is available, this point usually occurring at the last wheel or wheels of the machine. The selected pressure within the second stage is the pressure referred to above as "an intermediate pressure." This procedure conserves the recycle gas pressure and maintains full loading of the last wheels or wheel of the compressor. Neither the specific number of wheels contained in the two stages of the compressor nor the pressure or capacity limits of the compressor form any part of the invention and, along with other features such as wheel side wall area, annular passage configuration, etc., are merely matters of mechanical design of the compressor. It will also be understood that the compressor can be divided into a greater or lesser number of stages than the two stages of this example, the exact number depending on the total pressure differential necessary and on mechanical considerations. It will be still further understood that the invention is not limited to centrifugal compressors or to compressors of any particular design, but may be practiced with any type of compressor, including reciprocating compressor.

The compressed, admixed gases in line 26 are preheated by effluent from converter 38 in heat exchange zone 45. A portion of the gases in line 26 may by-pass heat exchange zone 45 to provide temperature control. The by-passed portion is re-combined with the gas preheated in heat exchange zone 45 and the entire gaseous stream is introduced into converter 38 which encloses a plurality of catalyst beds (not shown) and a heat exchanger 40. A major portion of the synthesis gas passes by means of line 33 into the converter through heat exchanger 40, within the converter, in indirect heat exchange with hot product gases and is thus further preheated to the desired temperature for initiating reaction. The preheated gas is returned to the top of the converter and then passes through the catalyst beds in series, the gas being heated by reason of the exothermic reaction of nitrogen and hydrogen to form ammonia taking place in each of the beds. The small amounts of methane, helium, argon and carbon dioxide present as impurities in the synthesis gas are inert in the ammonia synthesis reaction. Temperature of the reacting gases is controlled by injecting a minor portion of the relatively cool feed gas diverted from line 33 between the catalyst beds through lines 34 and 35. Only two such lines are shown, there being more or less depending on the number of catalyst beds. The hot gaseous effluent of the last of the series of catalyst beds then passes through heat exchanger 40 in indirect heat exchange with the incoming gas as foresaid.

The specific internal configuration of the converter, the number of catalyst beds, the temperature control technique used, the specific conditions of converter operation and the catalyst used therein form no part of this invention. The invention is equally applicable to any of the many known configurations, temperature control techniques, operating conditions and catalysts. Reference is made to a chapter entitled "Production of Synthetic Ammonia" in the book "Fertilizer Nitrogen—Its Chemistry and Technology" edited by Vincent Sauchelli, Reinhold Publishing Corporation, 1964, for further information regarding the various commercially important ammonia synthesis converter designs.

The gaseous stream containing product ammonia and unreacted synthesis gas is withdrawn from converter 38 through line 42, cooled in heat exchange zone 45 against incoming synthesis gas as described above, further cooled in heat exchange zone 44 to condense ammonia present, and introduced into separator 49 where liquefied ammonia is separated and withdrawn through line 47 to holding tank 56. The uncondensed gaseous stream is withdrawn via line 24 and a major portion thereof, which constitutes the recycle synthesis gas hereinabove referred to, is recycled to second stage 22 as aforesaid. Usually about 15% to about 25% of the synthesis gas mixture of hydrogen and nitrogen is converted to ammonia in the converter. The recycle stream of unreacted gases is therefore about three to about six times as large as the fresh synthesis gas stream introduced into the process. The invention is of course equally applicable to any degree of conversion and resultant ratio of recycle to fresh synthesis gas. A minor portion of the gaseous stream of line 24 is diverted through line 51 to purge gas separator 50 in which residual ammonia is separated and withdrawn via line 54 to holding tank 56. The gaseous stream remaining after this separation is purged from the process via line 52 in order to prevent the accumulation of inerts in the system.

It will be noted that product ammonia is separated from the effluent of converter 38 prior to recycle of the effluent to the second stage 22 of compressor 11, and no separation of product ammonia or other constituents is made from the combined fresh and recycle synthesis gas stream, which is passed directly from the second stage 22 of compressor, through heat exchanger 45 and into converter 38. A typical ammonia plant would employ a fresh synthesis gas input of about 6,000 mols per hour.

TABLE I

| Ref. Dwg. | Press., p.s.i.g. | Temp., °F. | Flow Rate, lbs./hr. | H$_2$O | N$_2$ | H$_2$ | NH$_3$ | Inerts | Vol., p.p.m. CO$_2$ |
|---|---|---|---|---|---|---|---|---|---|
| 10 | 353 | 100 | 856 | 0 | 24.9 | 74.7 | 0 | 0.4 | 5.0 |
| 14* | 906 | 345 | 856 | 0 | 24.9 | 74.7 | 0 | 0.4 | 5.0 |
| 20 | 896 | 46 | 856 | 0 | 24.9 | 74.7 | 0 | 0.4 | 5.0 |
| 24 | 1,952 | 110 | 4,085 | 0 | 22.0 | 66.0 | 2.0 | 10.0 | .9 |
| 26 | 2,150 | 152 | 4,941 | 0 | 22.6 | 67.7 | 1.6 | 8.1 | 0.9 |
| 52 | | | 41 | | | | | | |
| 58 | | | 815 | | | | | | |
| A* | 1,952 | 250 | 856 | 0 | 24.9 | 74.7 | 0 | 0.4 | |
| B** | 1,952 | 130 | 4,941 | 0 | 22.6 | 67.7 | 1.6 | 8.1 | 0.9 |

*A = Fresh gas leaving eighth wheel of second stage 22.
**B = Admixed recycle and fresh gases entering ninth wheel of second stage 22. First stage 12 and second stage 22 each contains nine compression wheels. The recycle synthesis gas is introduced between the eighth and ninth compression wheels of second stage 22.

In many cases of ammonia synthesis, it is necessary or useful to chill the compressed admixed gases after the second stage 22 of compressor 11 to condense and separate product ammonia from the compressed admixed gases since such separation will also remove with the condensed ammonia residual moisture. Residual carbon dioxide is also removed, in chemical combination with ammonia. This incidental, supplemental removal of carbon dioxide is helpful but not absolutely necessary, since the carbon dioxide level is reduced to tolerable levels, i.e., a level at which the poisoning effect of carbon dioxide on the catalyst is attenuated, during the fresh synthesis gas treatment as described above. However, the post compressor cooling and ammonia separation step has the extremely desirable effect of economically removing residual moisture, which is inimical to the catalyst, introduced in the fresh synthesis gas. The utilization of such post-compressor chilling and separation of product is shown in my prior and copending application S.N. 505,653. In cases where the fresh ammonia synthesis gas is obtained essentially free of moisture and the carbon dioxide content of the synthesis has been reduced to a minimal level by conventional and well-known carbon dioxide removal means, as described above, the dry, compressed admixed gases may be passed directly to the synthesis converter from the compressor without intervening product removal. A sufficiently dry ammonia synthesis gas is obtained, for example, in cryogenic processing of hydrogen containing gas such as the off-gas of steel making furnaces. Synthesis gases containing up to 10 p.p.m. carbon dioxide and no more than 20 p.p.m. water may safely and economically be introduced into ammonia synthesis catalyst. Likewise, product removal after the compressor and before the converter is not required in cyclic synthesis processes wherein the fresh synthesis gas is free of contaminants which would adversely affect the conversion catalyst or reaction and which would be (incidentally) removed by a product removal step. Thus, the aspect of the invention which forms the subject matter of this continuation-in-part is the utilization of a fresh synthesis gas free of deleterious quantities of contaminants inimical to the conversion step, e.g., water in the case of ammonia synthesis, which eliminates the necessity of employing the expedient of separating product from the reactant stream after the compressor and before the converter in order to remove the contaminant with the product.

It will be recognized that numerous valves, pumps, controls and other devices necessary for operation and control of the process are not shown in the drawings or set forth in the description. Since the use and function of such devices are well known to those skilled in the art, they have been omitted for the sake of clarity and brevity.

Table I sets forth a specific example of the operation of the preferred embodiment of the drawing including operating conditions, composition and flow rate of key streams, per 100 mols per hour of fresh synthesis gas input.

As previously stated, ammonia in the recycle gas and carbon dioxide in the fresh synthesis gas will, under certain conditions, react to form solid ammonium carbamate and, in the presence of water, to form the carbonate and bicarbonate. To insure efficient and economical operation in ammonia synthesis, a preferred embodiment of the invention requires the maintenance of conditions such that formation of solids in the compression equipment is precluded, since even small amounts of solids deposited on the blades of a centrifugal compressor or within the cylinders of a reciprocating compressor may require interruption of operation and damage the machine. Qualitatively, increasing the temperature and decreasing pressure militate against solids formation, since either change will favor the decomposition of the solid carbamate into its gaseous constituents, i.e., carbon dioxide and ammonia, in accordance with the following reaction (1)  $NH_4CO_2NH_{2(solid)} = 2NH_{3(gas)} + CO_{2(gas)}$ At low concentrations of ammonia and carbon dioxide in a gaseous mixture, their partial pressures may be represented as follows:

(2)  $P_{NH3} = (X_{NH3})(P)$ (3)  $P_{CO2} = (X_{CO2})(P)$ where:

$P_{NH3}$ is the partial pressure of ammonia,
$P_{CO2}$ is the partial pressure of carbon dioxide,
$X_{NH3}$ is the mol fraction of ammonia,
$X_{CO2}$ is the mol fraction of carbon dioxide and
$P$ is the total pressure of the mixture.

In accordance with the mass action principle the extent of carbamate formation from Equation 1 is dependent upon the value of K in the expression (4)  $K = (P_{NH3})^2 P_{CO2}$ It has been found from experience that the formation of solids will not occur if the value of K, as calculated from Equation 4, is maintained at or below a specific maximum value for any given temperature. A series of empirically determined sets of temperature and corresponding maximum K value are represented in Table II below, with K calculated from partial pressures expressed in p.s.i.a., and the temperature expressed in degrees Fahrenheit. Each set of data represents a maximum allowable K factor for the corresponding temperature which will preclude the formation of solids by reaction of ammonia and carbon dioxide.

TABLE II

| Maximum K (based on P in p.s.i.a.) | Corresponding Temperature | |
|---|---|---|
| | (° F.) | (° R.) |
| 20 | 30 | 490 |
| 112 | 70 | 530 |
| 345 | 100 | 560 |
| 945 | 130 | 590 |

From the data given in Table II, an empirical relationship between maximum K and the temperature is obtained which may be represented by the following equation (5) $$\log K_{max.} = -\frac{4828}{R} + 11.158$$

where R is the temperature in degrees Rankine and $K_{max}$ is the corresponding maximum allowable value of K which will preclude solids formation.

In general, the empirical relationship of Equation 5 provides a basis for estimating the allowable conditions of total pressure and concentration of ammonia and carbon dioxide which will preclude solids formation in a synthesis gas mixture at a given temperature, or conversely, for estimating the minimum temperature which will preclude solids formation in a synthesis gas mixture under given conditions of total pressure and concentrations of ammonia and carbon dioxide. The variables of compressor pressure, concentration of carbon dioxide and ammonia in the fresh and recycle synthesis gases respectively, and temperature within the compressor are all readily controlled by means well known to those skilled in the art. For example, the partial pressure of carbon dioxide can be attained by reducing the carbon dioxide content of the fresh synthesis gas by standard methods prior to introducing the fresh synthesis gas to the process. Ammonia partial pressure is controlled by the extent of removal of product ammonia from the converter effluent. Interstage cooling of the compressed gases controls the temperature and, of course, the total pressure is controlled by the compressor itself. Thus, the relationship disclosed herein can be utilized as a design criterion and ordinary engineering skills can design and operate the process so as to maintain the conditions within the compressor to preclude solids formation.

It should be noted that in Table I above, conditions in the admixed streams within the compressor are maintained well within the safe limits hereinabove set forth.

For example, the conditions set forth in Table I are evaluated in accordance with the above as follows:

(1) Admixed recycle and fresh synthesis gases (line B)

Table I

Total pressure = $P$ = 1952 p.s.i.g = 1967 p.s.i.a.
Partial pressure of $NH_3 = P_{NH_3} = X_{NH_3}P = .016 (1967) = 3.4$ p.s.i.a.
Partial pressure of $CO_2 = P_{CO_2} = X_{CO_2}P = 0.9 \times 10^{-6}$ $(1967) = .00177$ p.s.i.a.

Substituting the values of $P_{NH_3}$ and $P_{CO_2}$ in Equation 4

$$K = (P_{NH_3})^2 P_{CO_2} = (31.4)^2(.00177) = 1.75$$

Substituting a temperature of 590° R. (130° F.) from Table I in Equation 5

$$\log K_{max.} = -\frac{4828}{(590)} + 11.158 = 2.975$$

$$K_{max.} = 945$$

It is thus seen that the maximum allowable K value ($K_{max}$) required to preclude solids formation at a temperature of 130° F. is 945, well above the actual K value of 1.75.

Alternatively, substituting the calculated K value of 67.4 in Equation 5

$$\log 1.75 = -\frac{4828}{R} + 11.158$$

$$R = \frac{4828}{(11.158) - (0.242)}$$

$$R = 442°R = 18°F.$$

It is thus seen that the minimum temperature required to prevent solids formation under conditions yielding a K factor of 1.75 is −18° F., which is well below the actual temperature of 130° F.

Repeating these calculations with the data given in Table I for the admixed recycle and fresh synthesis gases after compression (line 26 of Table I) yields the results tabulated in Table III below.

TABLE III

| | $K_1$ | $K_{max.}$ | $T_1$, °F. | $T_{min.}$, °F. |
|---|---|---|---|---|
| Line B, Table I | 1.75 | 945 | 130 | −18 |
| Line 26, Table I | 2.35 | 2333 | 152 | −11 |

$K_1$ = Calculated value of K from Equation 5.
$T_1$ = Temperature of the gas mixture.
$K_{max.}$ = Maximum allowable K at temperature $T_1$.
$T_{min.}$ = Minimum allowable temperature at $K_1$.

It is seen from the above discussion and examples that the invention is generally accomplished by separating product from a conversion zone effluent, recycling the remaining reactants and admixing them under pressure, in a single piece of compression equipment, with fresh reactants, compressing the admixed stream to a desired pressure and passing the admixed stream without further product removal to the conversion zone. The invention is particularly applicable to the production of synthetic ammonia and if practiced in accordance with the empirical relationship disclosed herein the problem of solids formation within the single compressor can be avoided. Obviously, however, the invention is not limited to any one particular cyclic synthesis process but may be applied to any process requiring the recycling of gaseous reactants and their reintroduction with fresh reactants into a pressurized reaction zone, such as, for example, the synthesis of methanol from hydrogen and carbon monoxide.

It will be apparent to those skilled in the art that many modifications and alterations may be made to the process described herein without departing from the spirit or scope of the present invention. The invention is not to be limited by the specific description and examples set forth, but it should be understood that the invention is defined in the accompanying claims.

What is claimed is:

1. A process for the synthesis of a compound at elevated pressures from reactants contained in a synthesis gas wherein less than the entire amount of reactants present in said synthesis gas react to form said compound and the unreacted portion of said reactants is recycled to a reaction zone which comprises introducing fresh synthesis gas containing said reactants into a compressor through the compressor intake and compressing said fresh synthesis gas to an intermediate pressure, introducing recycle synthesis gas, obtained as hereinafter defined, into said compressor downstream of said compressor intake, admixing and compressing said fresh and recycle synthesis gases in said compressor to a final elevated pressure, withdrawing thus admixed and compressed gases and passing them without separation of said compound therefrom to a reaction zone wherein a portion of said reactants react to form said compound, withdrawing thus partially reacted gases and separating said compound therefrom, and passing the remaining gases from said reaction zone as said recycle synthesis gas to said compressor, said recycle synthesis gas being passed to said compressor at substantially the same pressure at which it emerges from said reaction zone.

2. The process of claim 1 in which said compressor is a multi-wheel centrifugal compressor having a fresh synthesis gas intake at the low pressure end of said compressor, having an admixed gas outlet at the high pressure end of said compressor, and having a recycle synthesis gas sidestream inlet between said intake and said outlet.

3. A process for the synthesis of ammonia at elevated pressures from nitrogen and hydrogen contained in a synthesis gas wherein less than the entire amount of hydrogen and nitrogen present in said synthesis gas react to form ammonia and the unreacted portion of nitrogen and hydrogen is recycled to a conversion zone which comprises introducing fresh synthesis gas containing nitrogen and hydrogen into a compressor through the compressor intake and compressing said fresh synthesis gas to an intermediate pressure, introducing recycle synthesis gas, obtained as hereinafter defined, into said compressor downstream of said compressor intake, admixing and compressing said fresh and recycle synthesis gases in said compressor to a final elevated pressure, withdrawing thus admixed and compressed gases and passing them without separation of ammonia therefrom to a conversion zone wherein a portion of the nitrogen and hydrogen react to form ammonia, withdrawing thus partially reacted gases and separating ammonia therefrom, and passing the remaining gases from said conversion zone as said recycle synthesis gas to said compressor, said recycle synthesis gas being passed to said compressor at substantially the same pressure at which it emerges from said reaction zone.

4. The process of claim 3 in which the admixed fresh synthesis and recycle gases contain carbon dioxide impurity and residual ammonia and the partial pressures of ammonia and carbon dioxide and the temperature are such that the relationship $$\log K_{max} = \frac{-4828}{R} + 11.158$$

is satisfied throughout the compression of said admixed gases, where R is the temperature of the admixed gases in degrees Rankine and $K_{max}$ is greater than the value of K determined by the relationship $$K = (P_{NH_3})^2 P_{CO_2}$$

in which $P_{NH_3}$ is the partial pressure of ammonia calculated as the mathematical product of the mol fraction of ammonia in the admixed gases and the total pressure in pounds per square inch absolute, and $P_{CO_2}$ is the partial pressure of carbon dioxide calculated as the mathematical product of the mol fraction of carbon dioxide in the admixed gases and the total pressure in pounds per square inch absolute.

5. The process of claim 3 in which said fresh synthesis gas contains carbon dioxide impurity and is at a pressure of about 1200 p.s.i.g. to about 3000 p.s.i.g. and a temperature of about 225° F. to about 325° F. immediately prior to admixture with said recycle synthesis gas, said recycle synthesis gas is at a pressure of about 1200 p.s.i.g. to about 3000 p.s.i.g. and a temperature of about 85° F. to about 185° F. immediately prior to admixture with said fresh synthesis gas, and said fresh synthesis gas and said recycle synthesis gas are admixed and compressed to a final pressure of about 1400 p.s.i.g. to about 3200 p.s.i.g. and a final temperature of about 100° F. to about 225° F.

References Cited

UNITED STATES PATENTS 3,350,170  10/1967  Finneran et al. _____ 23—199

OSCAR R. VERTIZ, Primary Examiner

H. S. MILLER, Assistant Examiner

U.S. Cl. X.R.

23—289; 260—449.5